(12) United States Patent
Nickum

(10) Patent No.: US 6,359,661 B1
(45) Date of Patent: Mar. 19, 2002

(54) MULTIPLE USER PROFILE REMOTE CONTROL

(75) Inventor: Larry A. Nickum, Sioux City, IA (US)

(73) Assignee: Gateway, Inc., N. Sioux City, SD (US)

( * ) Notice: Subject to any disclaimer, the term of this patent is extended or adjusted under 35 U.S.C. 154(b) by 0 days.

(21) Appl. No.: 08/743,232

(22) Filed: Nov. 5, 1996

(51) Int. Cl.[7] ............................................. H04N 5/00
(52) U.S. Cl. ........................................ 348/734; 725/25
(58) Field of Search ............................... ; 348/5.5, 734, 348/725, 731; 340/825.31, 825.06, 825.03, 825.57; 725/25, 27, 29, 30; H04N 5/00, 5/44

(56) References Cited

U.S. PATENT DOCUMENTS

| | | | |
|---|---|---|---|
| 4,081,754 A | 3/1978 | Jackson | 325/396 |
| 4,228,543 A | 10/1980 | Jackson | 455/181 |
| 4,510,623 A * | 4/1985 | Bonneau et al. | 455/181 |
| 4,718,107 A | 1/1988 | Haynes | 455/4 |
| 5,046,093 A * | 9/1991 | Wachob | |
| 5,168,372 A * | 12/1992 | Sweetser | 348/5.5 |
| 5,382,983 A | 1/1995 | Kwoh et al. | 348/716 |
| 5,465,113 A | 11/1995 | Gilboy | 348/5.5 |
| 5,477,262 A | 12/1995 | Banker et al. | 348/7 |
| 5,485,518 A | 1/1996 | Hunter et al. | 380/20 |
| 5,550,575 A * | 8/1996 | West et al. | 348/5.5 |
| 5,663,756 A * | 9/1997 | Blahut et al. | 348/5.5 |

FOREIGN PATENT DOCUMENTS

| | | | | |
|---|---|---|---|---|
| CA | 2142025 | * | 5/1996 | |
| DE | 9417937 | * | 4/1995 | |
| JP | 0177071 | * | 8/1986 | H04N/5/00 |
| WO | 96/34491 | * | 10/1996 | |

* cited by examiner

*Primary Examiner*—David E. Harvey
(74) *Attorney, Agent, or Firm*—Kenneth J. Cool; Rodney L. Lacy; Schwegman, Lundberg, Woessner & Kluth

(57) ABSTRACT

A method and apparatus for controlling access to television programming uses a remote control device. The remote control device contains program control data which limits the viewer's access to television programming. The program control data is created and modified by a user with the master control user id assigned to the remote control device. The remote control device is optionally assigned one or more user ids for creating, maintaining, and in one embodiment activating a user-customizable profile which controls programming access according to the users preferences. The program control data, user profile data, and related circuitry is stored in the remote control device, or alternatively in the television receiver or a control device attached to the television receiver. Where the circuitry is not in the remote control devices the remote control device has a unique identifying signal which causes the programming control circuitry to employ the program control data and user profile data associated with that particular remote control device.

2 Claims, 7 Drawing Sheets

MULTIPLE USER PROFILE REMOTE CONTROL

FIELD OF THE INVENTION

The present invention relates in general to methods and apparatus for wireless control of entertainment systems, and particularly to multiple wireless units providing user defined programming control.

BACKGROUND OF THE INVENTION

There has been interest in controlling access to television programming for a number of years. The primary users of this type of technology are parents who wish to limit their children's access to certain programming. With the increasing amount of available programming, however, viewers in general are looking for a convenient way to limit their selection to only the channels in which they are interested.

There have been several attempts to address this need. Conventional programming access control systems are incorporated into the television receiver or, in the case of cable television subscribers, in the cable converter box. U.S. Pat. No. 5,382,983, issued to Kwoh et al., describes programming control circuitry which may be located in a remote control device, the television itself, or an attached device such as a cable converter box.

The conventional systems permit the owner to program the television circuitry such that selected channels are blocked. Some systems block the entire channel, while others allow the owner to block out just certain blocks of time. One undesirable effect of these systems is that once a channel is blocked it is blocked for all viewers. A user can, in some systems, override channel restrictions by keying in a special code, although having to remember the code and key it in each time the viewer wants to select the restricted channel is in itself an inconvenience. What is needed is a means of restricting the programming access of certain users without impacting the viewing options for other users.

Another undesirable effect of blocking a channel in the television circuitry is that a channel-surfing viewer still passes through that channel even though the television signals on that channel are not displayed on the television monitor. One reason this is undesirable is, especially if there is more than one blocked channel, the viewer has to pass through inactive channels while scanning for programming to watch. Another reason is that the constant reminder that there are "prohibited" channels may tempt the restricted viewer to try and exceed their allowable viewing boundaries. There is a need for a means for controlling viewing access on a viewer-by-viewer basis, such that each viewer sees only those channels they wish to or are allowed to see.

SUMMARY OF THE INVENTION

Access to television programming is controlled using a remote control device. Programming control circuitry, in one embodiment, is incorporated in the remote control device. This allows programming access to be user-specific, each viewer restricted according only to the programming controls embodied in the memory of the remote control device they are using. The method and apparatus of the invention thereby avoids the conventional limitation of establishing programming access which affects all viewers alike, allowing each user access to all programming to which they are allowed unaffected by other viewers' restrictions.

According to one embodiment the present invention provides a method for controlling television programming a remote control device, wherein the remote control device comprises a user input interface, a processor, and a memory. The method comprises the steps of storing a unique user id in the memory of the remote control device, independently storing program control data in the memory of the remote control device for controlling television programming by remote control device, and independently controlling access to television programming through the remote control device according to the unique user id and program control data stored in the remote control device. In another embodiment the method controls television programming using two or more independent remote control devices, wherein each remote control device comprises a user input interface, a processor, and a memory.

A further embodiment of the present invention further comprises the step of verifying a master control user id, and upon successful verification allowing unlimited access, for a predetermined amount of time, to programming using the remote control device. According to another aspect of the method of controlling television programming, user input data requesting programming is compared to program control data stored in the remote control device, and if the input data matches then the user is denied access to the requested programming.

In another embodiment of the present invention a user is allowed to modify the program control data stored in the memory of the remote control device when the user inputs the proper user id and that user id is verified. In yet another embodiment independent user profile data is stored in a remote control device. The user profile data provides user-customizable access to programming via the remote control device. Each user establishes a personalized viewing environment through use of the user profiles. According to one embodiment the remote control device has one user profile which is active at all times. In another embodiment the remote control device may have one or more user profiles, any one user profile of which is activated by the user inputting a unique user id. Verification circuitry activates the user profile corresponding to the input user id if it matches the user id stored in association with the user profile. A further aspect of the present invention provides a system for controlling television programming, comprising a television receiver and a remote control device. The remote control device comprises a user input interface, a memory, means for storing a unique master control user id in the memory, means for storing program control data associated with the unique master control user id in the memory, and circuitry for controlling access to television programming according to the program control data.

Yet another embodiment of the present invention provides a system for controlling television programming, comprising a television receiver and two or more remote control devices. Each remote control device comprises a user input interface, a memory, means for storing a unique master control user id in the memory, means for storing program control data associated with the unique master control user id in the memory, and circuitry for controlling access to television programming according to the program control data.

According to another aspect of the present invention the system for controlling television programming further comprises circuitry for comparing input entered through the user input interface to the program control data stored in the memory. Yet another embodiment comprises circuitry for adding, modifying, or deleting program control data stored in the memory. A further embodiment comprises means for storing a unique user id in the memory and means for storing user profile data associated with the unique user id in the memory. In this embodiment, the circuitry for controlling access to television programming further comprises circuitry for comparing input entered through the user input interface to the user profile data stored in the memory. In yet another aspect of the present invention each remote control device further comprises circuitry for adding, modifying, or deleting user profile data stored in the memory.

DETAILED DESCRIPTION OF THE PREFERRED EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense, and the scope of the present invention is defined by the appended claims.

Figure 1:
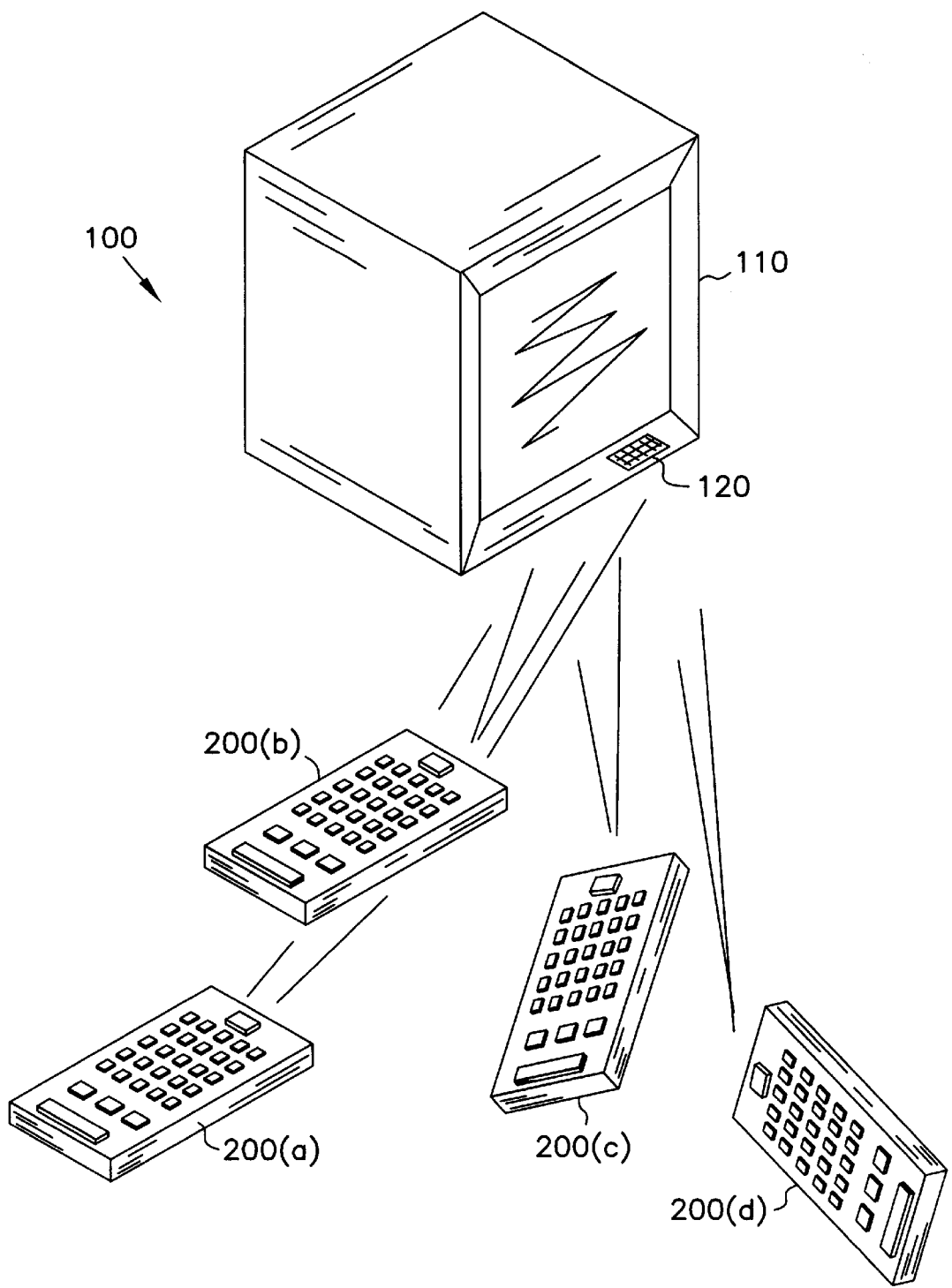
FIG. 1 is a pictorial representation of a television monitor and multiple remote control devices according to one embodiment of the present invention.

FIG. 1 shows a pictorial representation of a television receiver 110 and corresponding multiple remote control devices 200a, b, c, d according to one embodiment of the present invention. The system 100 provides for user control of television programming by means of remote controls 200a–d. Television programming comprises the functions of television receiver 110, such as volume, channel access and display, and power off or on. According to one embodiment television programming also includes program identification codes incorporated into the program signals. In the embodiment shown remote control devices 200a–d communicate with monitor 110 via window 120 using infra red (IR) control signals. Those skilled in the art will recognize, however, that radio frequency (RF) or other electromagnetic signals can be used in the place of IR without exceeding the scope or spirit of the present invention. RF control signals, received at the television through an antenna (not shown), are preferable in a situation where the monitor 110 is in a different room from remote control device 200 or where a clear line of sight is not available. Alternatively, IR control signals may be selected because of the availability of standard circuitry at low cost.

Figure 2:
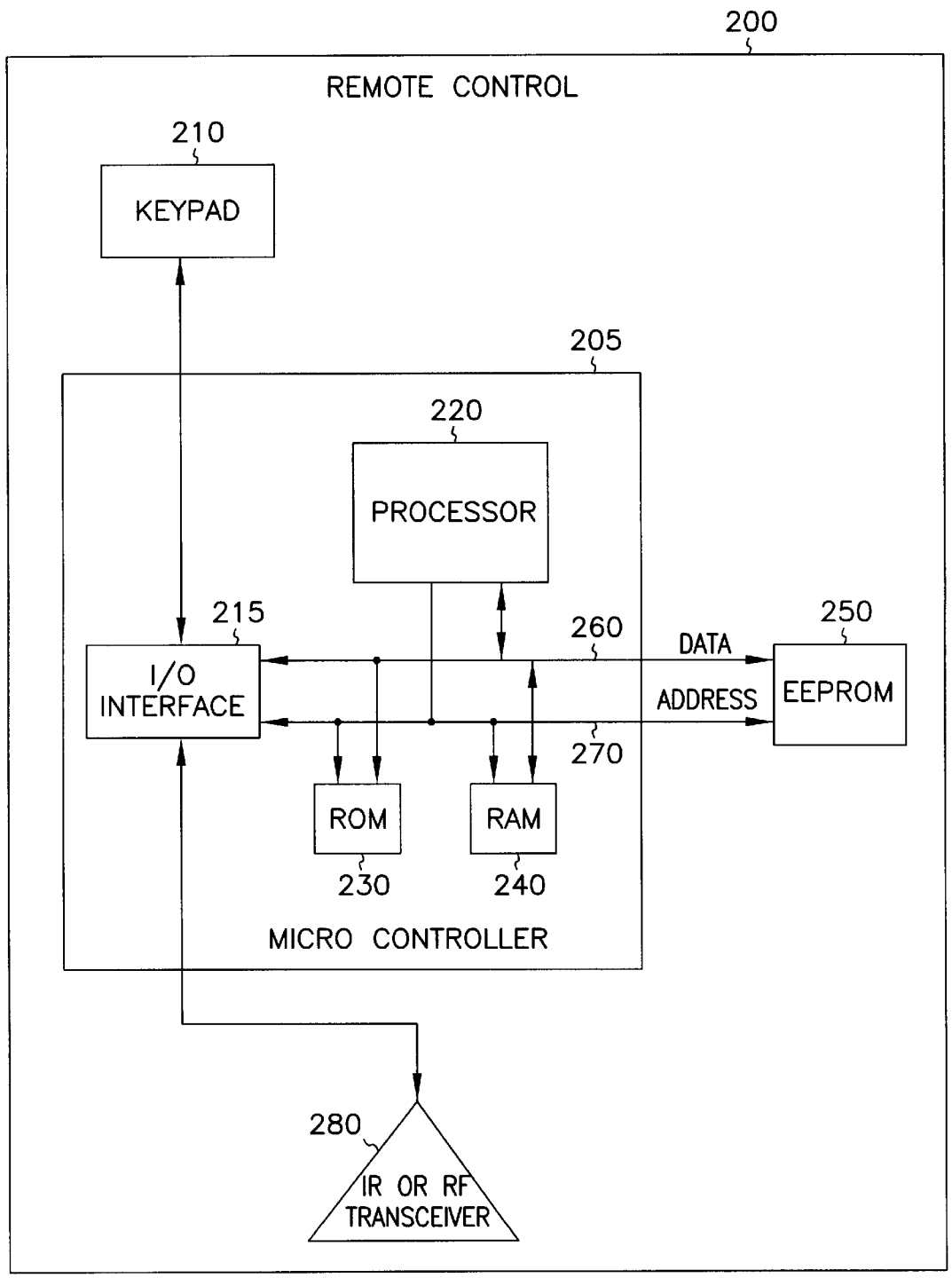
FIG. 2 is a schematic block diagram of circuitry in a remote control device according to one embodiment of the present invention.

FIG. 2 is a block diagram showing elements of the circuitry of one embodiment of the present invention. Remote control device 200 comprises keypad 210 for user input, electromagnetic transceiver 280 for communications between remote control device 200 and a video monitor (not shown), electrically erasable programmable read-only memory (EEPROM) 250 for storing and processing key combination data, all electrically connected to micro controller 205. One example of a commercially available EEPROM which is used in one embodiment of the present invention is the Hitachi HN58C65. Micro controller 205 controls the remote control device's various functions and communications between the devices incorporated in remote control device 200. In the embodiment shown, transceiver 280 is coupled to all the keys for generating RF signals corresponding to the keys pressed. Those skilled in the art will recognize, however, that infrared (IR) or any other wireless communication technology can be used in the place of RF signals.

Micro controller 205 manages communication between the other elements of remote control device 200. It comprises an input/output (I/O) interface 215, a processor 220, read only memory (ROM) 230 and random access memory SAM) 240. The input/output interface 215 is electrically connected through direct signals to the keypad 210 for processing user-input commands. The elements of micro controller 205, and EEPROM 250 are also electrically connected, in the embodiment shown, via data bus 260 and address bus 270.

Figure 3:
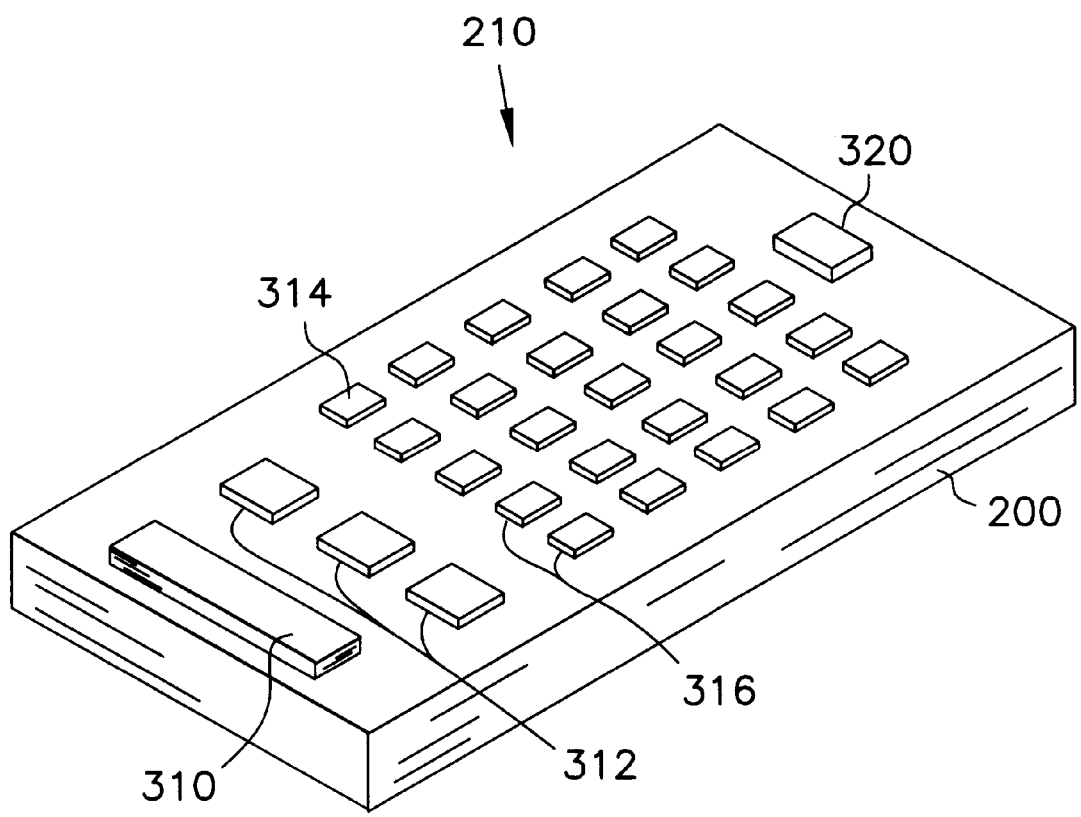
FIG. 3 is a perspective view of a remote control device incorporating the circuitry shown in FIG. 2.

FIG. 3 is a block diagram of a remote control device 200 according to one embodiment of the present invention. In the embodiment shown, remote control device 200 is a hand held-size device. A viewer inputs commands and control information using the various keys which make up keypad 210. Keypad 210 comprises keys for conventional television control, including but not limited to the following examples. Power key 310 provides power-on/off functions for the monitor. Channel control keys 316 provide the familiar television/VCR up and down channel control function. Volume control buttons 312 include a mute function!. According to one embodiment of the present invention, an id function key 320 is used to activate user identification and verification functions provided by firmware and/or circuitry within micro controller, 205. Much as the "Ctrl" and "Alt" keys are used on a computer keyboard to select different functions, the id function key 320 is similarly used on the hand held remote to select the functions defined by the program control circuitry. In one embodiment of the present invention the program control circuitry is incorporated, along with user verification circuitry (explained later in conjunction with FIG. 4); in each remote control device. In other embodiments the program control circuitry is incorporated in the television receiver, a cable control box, or a separate tuner. According to either of these embodiments the program control circuitry is activated by pressing program key 314. In an alternative embodiment, where the program control circuitry is always active, the user verification circuitry is triggered only by a user pressing id function key 320. In other embodiments different designs are employed for remote control device 200. For example, a remote control device designed for easier use by children may have larger and/or fewer keys, symbols (such as animal figures) instead of characters on the keys, and so forth.

Figure 4:
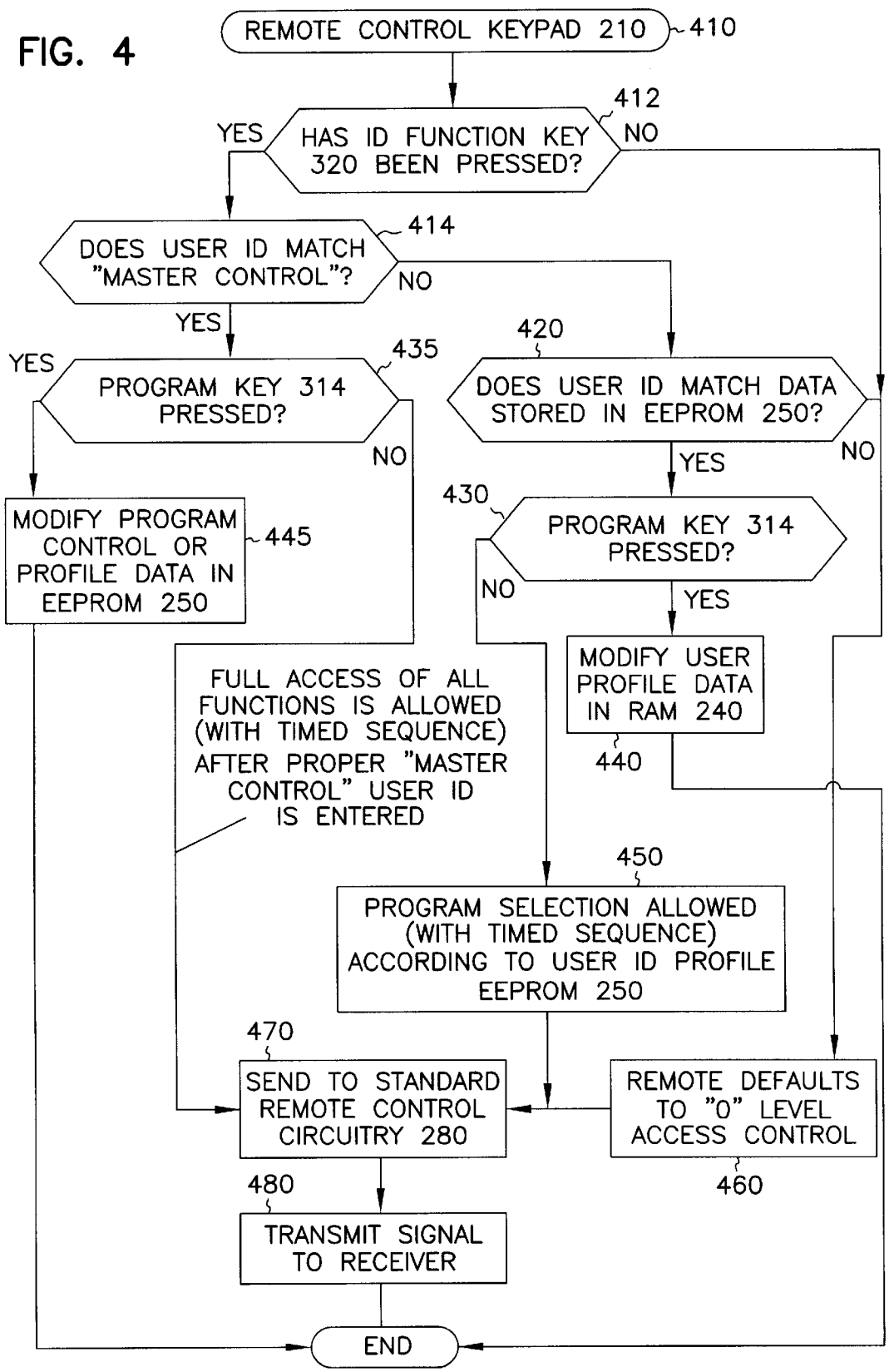
FIG. 4 is a logic flow diagram illustrating an input verification process according to one embodiment of the present invention.

Each remote control device 200 is assigned at least one unique user id which is stored in EEPROM 250. A user id comprises a predetermined sequence of alphanumeric keys for each user. In another embodiment, each remote control device 200 is assigned two or more unique user ids. Each user id is one of two types—a "master control user id" provides access to program control parameters, while a "user id" provides access to viewer profile parameters. For general viewing operations, such as selecting channels or adjusting volume, the user is not required to input either type of user id. When no user id is input the remote device defaults to the lowest level of access as defined by the program control parameters. When a user presses the id function key 320, user verification firmware and/or circuitry is activated which, in one embodiment, waits for the user to key in a user id. In another embodiment the user is prompted to input a user id by a message displayed on, the television monitor. The code input by the user is processed by the firmware and/or circuitry embodied in micro controller 205 according to the steps outlined below (FIG. 4 and accompanying text). The user verification process checks user ids stored in EEPROM 250 for a match with the input user id. If there is no match then the default environment remains active.

The embodiments below are described in terms of a software program that controls access to memory. It will be apparent to one skilled in the art, however, that this is only one of several possible implementations of the invention.

FIG. 4 is a block flow diagram showing the process by which a viewer uses a remote control device according to one embodiment of the present invention. Those skilled in the art will recognize that the process represented by FIG. 4 can be executed by circuitry incorporated in the remote control devices, the television receiver, or an attached device such as a cable control box without exceeding the spirit and scope of the present invention. Alternate embodiments include embedding the logic flow in firmware or in a microcoded processor, executing it, as a software program in a processor, or creating a state machine with states determined by the results of the decision blocks in the logic flow. Wherever it resides, the circuitry is triggered at block 410 by a viewer selecting, one of the buttons on keypad 210. The first step, occurring at decision block 412, is to determine whether it was the id function key 320 which was pressed. If the id function key 320 was selected, then at decision block 414 the user verification process compares the input user id against the user ids stored in EEPROM 250. If the input user id matches the master control user id then the next key selected is evaluated at decision block 435. If program key 314 is that next key, then the user is allowed at block 445 to modify the program control data and profile data contained in the remote's EEPROM 250. If any other key besides program key 314 is that next key, the viewer is given access for a predetermined time period to all functions of the television, the user selections being sent at block 470 to the standard remote control circuitry 280. From there the signal is transmitted at block 480 to the receiver controlling the television receiver. In one embodiment the predetermined time period is a matter of seconds, just long enough to select a particular channel. In another embodiment the time period is several minutes, to allow the viewer time to preview a number of channels.

Figure 5:
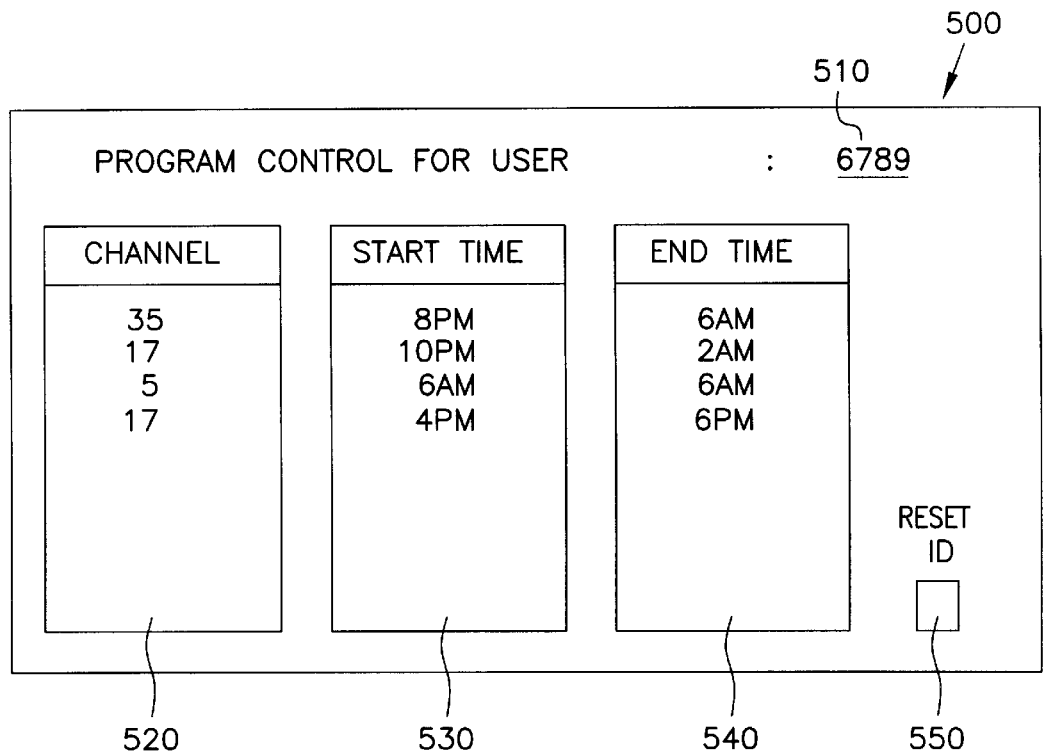
FIG. 5 is a block diagram showing a menu screen for modifying program control parameters.

Program control data comprises user ids and associated parameters such as channel identifiers and start and stop times. When the user has entered a valid master control user id and then pressed program key 314, a menu screen to modify program control parameters is displayed on the television monitor. FIG. 5 shows one example of such a menu screen 500 for the embodiment of the present invention where each remote control device is assigned a single user id. When the screen 500 is first displayed, it lists the current user id 510. If the user wishes to change the user id he or she keys it in over the displayed user id 510. In fields associated with channels 520 are start and end times 530, 540 identifying the periods the remote control device prevents access to channels 520. If the user wishes to change the master control user id, he or she selects the reset id field 550. A prompt (not shown) is displayed on the screen in which the user types the new control user code. To add new channels or times to block for the remote control device, the user selects the respective fields and enters the appropriate information. In the example shown in FIG. 5, the remote control device is prevented from accessing channel 5 at any time, channel 17 from 4 to 6 p.m. and 10 p.m. to 2 a.m., and channel 35 from 8 p.m. to 6 a.m. The user is able to add, delete, or modify parameter values in the display. The displayed parameter values are stored in EEPROM 250 when the user exits the display by pressing program key 314 again.

Figure 6:
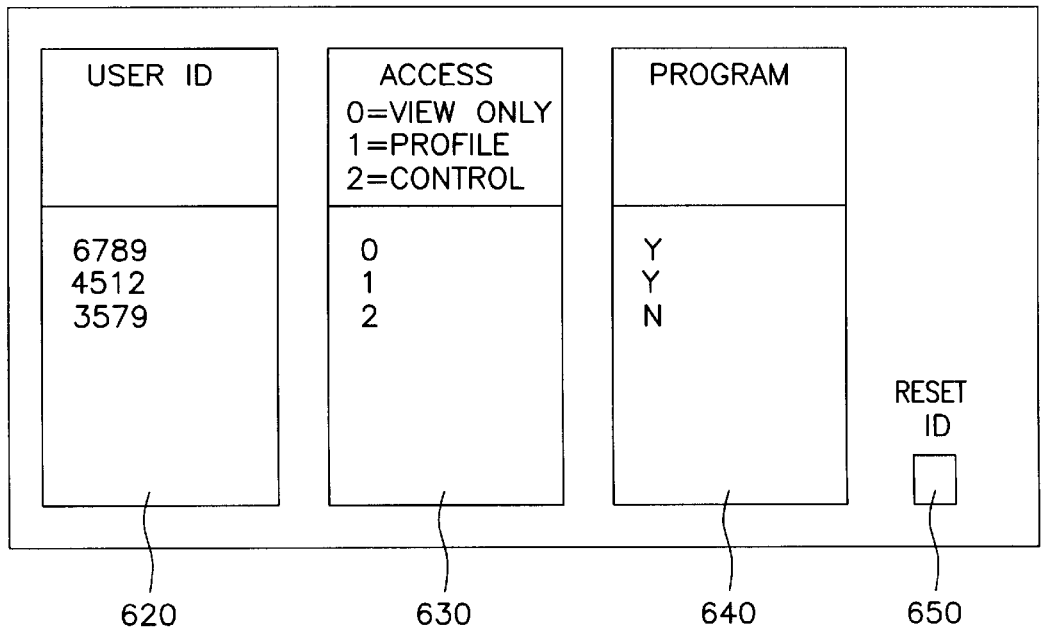
FIG. 6 is a block diagram showing a menu screen for modifying viewer control parameters.

In another embodiment of the present invention, in which multiple viewers use the same remote control device, there is an additional menu screen for editing viewer control parameter values. FIG. 6 shows one example of such a menu screen 600. Screen 600 is the first one displayed after the user has entered a valid master control user id and then pressed program key 314. If the user wishes to change the master control user id, he or she selects the reset id field 550. The display fields list the currently active user ids 620, the level of access granted to each user id 630, and an indicator of whether programming restrictions have been defined for the respective user ids 640. To see or modify the specific programming restrictions associated with a particular user id 620, the user selects the corresponding entry in the program field 640. The system then displays the screen shown in FIG. 5 (described above), showing the parameter values for that user id and allowing the user to add, delete, or modify parameter values.

In the embodiment represented in FIG. 6, where multiple viewers use the same remote control device, default access is at the lowest common denominator - defined access limitations are in effect regardless of the associated user id if the remote control device is used without entering a user id. User ids stored in EEPROM 250 are granted one of three access levels. The lowest is "view only", which indicates that when a user keys in the user id, they have access to all programming except that which is explicitly restricted to that particular user id. The next level is "profile", at which the user has access to all programming except that which is explicitly restricted when; they key in the user id, and in addition the user can create and maintain a user profile further controlling the viewing environment (described in more detail below) when they select the program key 314 as described above. The highest level is "control", at which the user who types in the associated user id has complete access to all progranmming, but cannot program other users' access parameters. A viewer with control-level access is also able to create and maintain a user profile for their user id.

In one embodiment RAM 240 (in FIG. 2) stores user profile information; customizing the viewing environment for the viewer using the remote control device. For example, each user can customize a remote control device for their own particular tastes in television programming. In one embodiment each user has their own customized remote control device, while in another embodiment a number of viewers can use the same remote control device, each viewer entering a unique user id to activate their particular customized viewer profile. The viewer profile may be a single level of programming control, identifying which programming is activated by the remote control device. Alternatively, the viewer profile may be a hierarchy of programming, wherein the user defines groups of programming by subject, such as 'sports' or 'news' and the remote control device only activates the programming within the selected group. When a user presses the id function key 320 and enters the user id, the code is verified against the user ids stored in EEPROM 250. If the entered code is a valid profile code, the user is presented with a menu for modifying or activating their profile.

Figure 7:
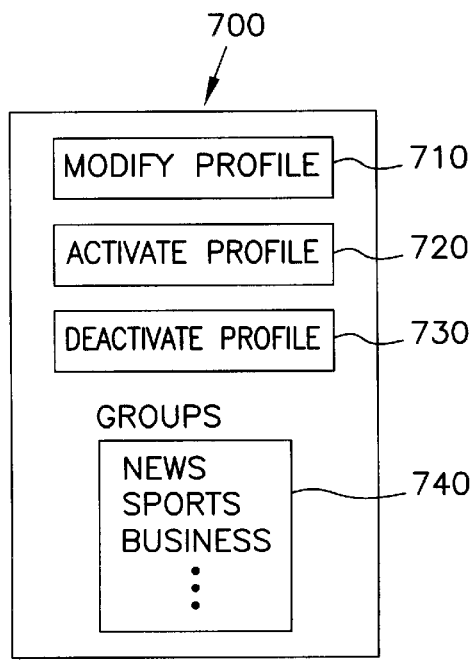
FIG. 7 is a block diagram showing a menu screen for modifying viewer profile parameters.

FIG. 7 is one example of such a menu 700. If the user is currently viewing in the default environment, they can activate their profile by selecting the 'activate profile' icon 720. Their viewing environment is then controlled by both the restrictions defined by the programming control data as well as any restrictions they have defined for themselves in their profile. The profile stays active until the user activates this menu 700 again and selects the 'deactivate profile' icon 730. Alternatively, the user may choose to activate one of the groups they have predefined using the procedures outlined below. The user selects the group they want active from the list of currently defined groups 740, and then their viewing environment is restricted to only those channels identified as being within the selected group. This allows the user to limit the scope of channels visited while channel surfing to those related to a particular area of interest such as new or sports. Any one channel may be in any number of groups. When a particular group is active, the user may select a different group 740 or the profile 720 by activating this menu 700 again and making the desired selection. The user returns to the default viewing environment by selecting 'deactivate profile' 730.

Figure 8:
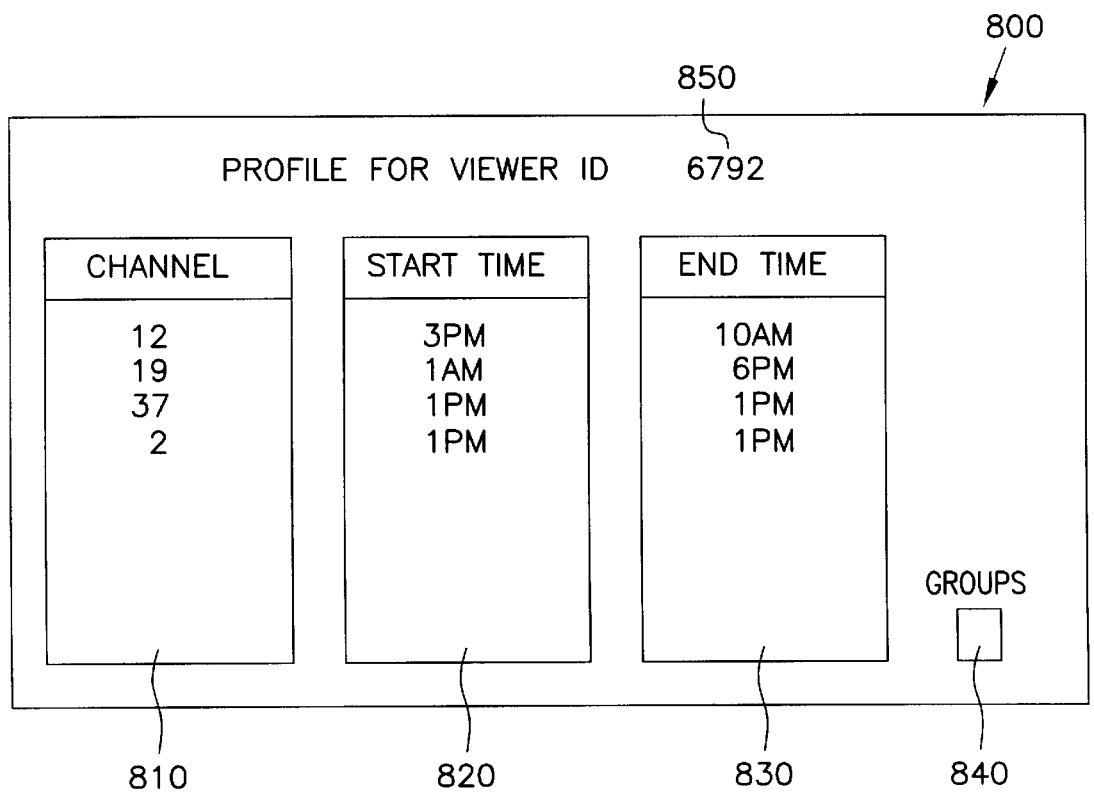
FIG. 8 is a block diagram showing a menu screen for modifying individual programming within a viewer profile.
Figure 9:
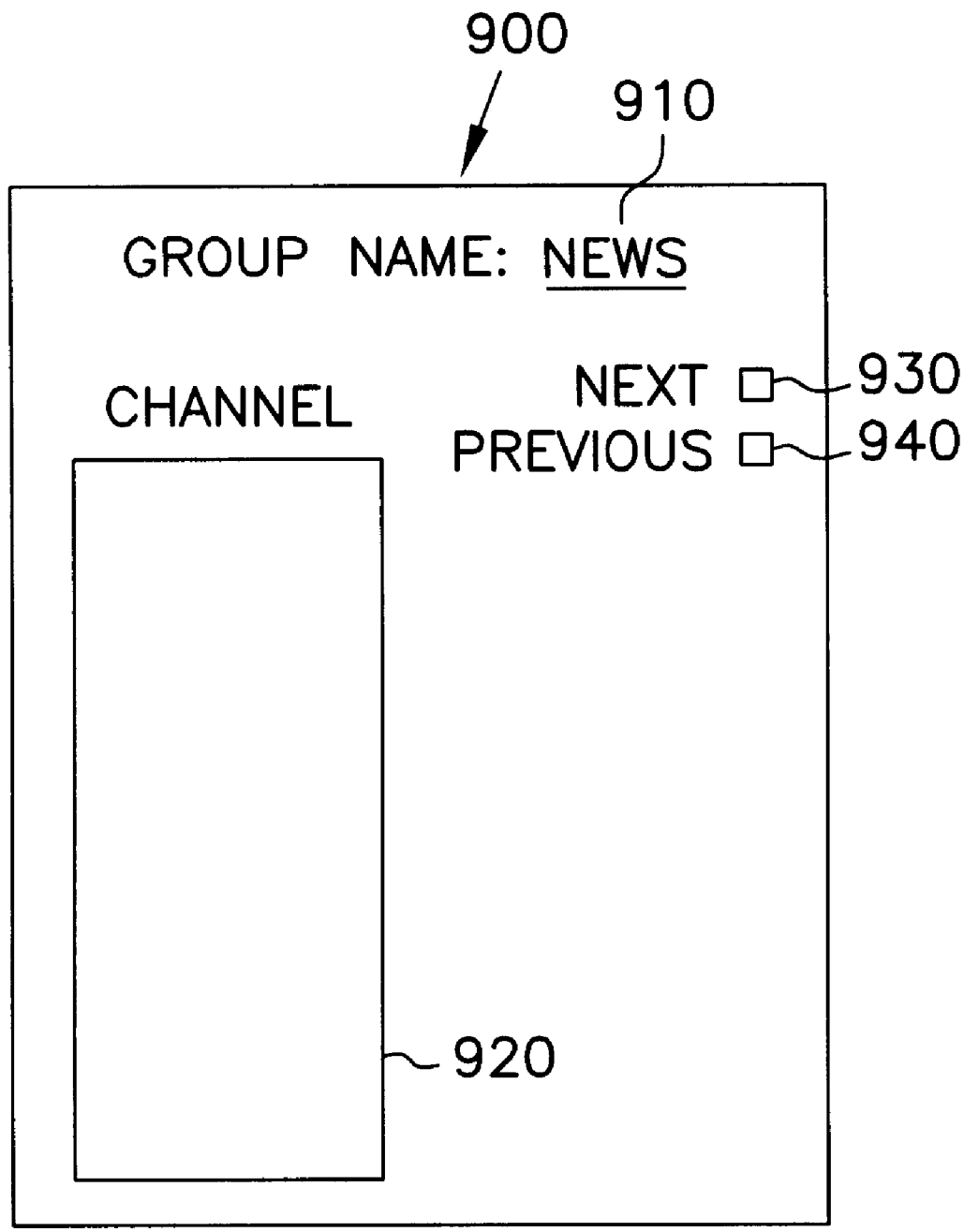
FIG. 9 is a block diagram showing a menu screen for modifying a programming group within a viewer profile.

When the user wishes to modify their profile they select the 'modify profile' icon 710. The user is then presented with a menu showing the profile as it is currently defined. FIG. 8 shows one!example of the menu 800 presented when the user selects the such a menu. In the example shown the user has entered user id 6792 850. The menu displayed shows that the specified user id has chosen to prevent certain channels 810 from being visited when channel surfing during certain times of the day between the specified start time 820 and end time 830. As an example, profile Channels 37 and 2 are never visited. In one embodiment the channels are always blocked for the specified user id 850, while in an alternate embodiment the channels are blocked only when channel surfing but may be visited by specific selection of the channel. If the user selects the 'groups' icon 840, the user is able to create and maintain viewing groups. FIG. 9 shows one example of the menu presented when the 'groups' icon 840 is selected. The user selects a unique name 910 for the group, and then identifies the channels 920 which are to be available when the group is selected. In the embodiment shown, the group name comprises alphanumeric characters. According to one embodiment, the user activates a submenu to create a new group name. The user is presented with a grid from which individual characters are selected using the directional arrow keys on keypad 210. The user creates or modifies additional groups by selecting the 'next' 930 or 'previous' 940 icons.

Returning to the block diagram shown in FIG. 4, at block 412 the logic identifies the button selected. If the viewer selects a button on keypad 210 which is not the id function key 320 then the remote device defaults to the lowest level of access control at block 460. According to one embodiment, the lowest level of access is established by combining all restrictions defined for all active profiles associated with that particular remote control device. If the user selection is not one of those blocked according to program control data in EEPROM 250 then the user selection is sent at block 470 to the standard remote control circuitry 280. From there the signal is transmitted at block 480 to the receiver controlling the television receiver. If id function key 320 has been pressed at decision block 412 and the input user id does not match the remote device's one or more master control user ids at decision block 414, it is determined at decision block 420 whether the input user id matches any of the other user ids stored in EEPROM 250. If the input user id does not match any of the stored user ids then the remote device defaults to the lowest level of access control at block 460. If the user selection is not one of those blocked according to program control data in EEPROM 250 then the user selection is sent at block 470 to the standard remote control circuitry 280. From re the signal is transmitted at block 480 to the receiver controlling the television receiver.

If at decision block 420 the input user id matches a user id stored in EEPROM 250, and program key 314 has not been pressed at decision block 430, then for a predetermined period of time the viewer is allowed to select programming according to their particular user id profile at block 450. The viewer's selection is then sent at block 470 to the standard remote control circuitry 280, and from there the signal is transmitted at block 480 to the receiver controlling the television receiver. If, however, at decision block 420 the input user id matches a user id stored in EEPROM 250 but program key 314 is pressed at decision block 430, then the viewer is able to modify their user profile data according to the procedures described previously (block 440, FIG. 4, and accompanying text).

In an alternate embodiment, the user profile and programming restrictions are stored in circuitry within the television or an attached device such as a cable control box. Each remote control device has, instead of the circuitry described earlier (FIG. 2 and accompanying text), an individualized identifying signal incorporated in the conventional circuitry. Each user selection is then accompanied by the identifying signal, which is translated by the circuitry in the television or attached device in order to reference the proper user profile and assigned viewing restrictions. In this embodiment the circuitry in the television or attached device performs essentially the same tasks as the EEPROM 250 in the embodiment described previously.

It is to be understood that the above description is intended to be illustrative, and not restrictive. Many other Embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus for controlling access to and display of television programming, comprising:

a television receiver, comprising a display;

a first remote control device for requesting programming to be transmitted to the display by the television receiver, wherein the first remote control device includes a unique identifier in the signal sent to the television receiver when programming is selected using the first remote control device, wherein the first remote control device further comprises user profile data for controlling television programming by the first remote control device, wherein the user profile data is customizable by a user;

a memory for storing program control data, wherein the program control data comprises programming restrictions associated with the unique identifying signal of the first remote control device;

a processor electrically connected to the television receiver and the memory, the processor for processing programming requests sent by the first remote control device; and a second remote control device for requesting programming to be transmitted to the display by the television receiver, wherein the second remote control device includes a unique identifier in the signal sent to the television receiver When programming is selected using the second remote control device, and wherein the program control data stored in the memory further comprises programming restrictions associated with the unique identifying signal of each of the first and second remote control devices, and wherein the processor processes programming requests sent by each of the first and second remote control devices.

2. A method for controlling access to and display of television programming, comprising:

requesting programming to be transmitted to a display by a television receiver, wherein the requesting is performed by a first remote control device, wherein the first remote control device includes a unique identifier in a signal sent to the television receiver when programming is selected using the first remote control device, wherein the first remote control device further comprises user profile data for controlling television programming by the first remote control device, wherein the user profile data is customizable by a user;

storing program control data in a memory, wherein the program control data comprises programming restrictions associated with the unique identifying signal of the first remote control device;

processing programming requests sent by the first remote control device, wherein the processing is performed by a processor electrically connected to the television receiver and the memory; and requesting programming to be transmitted to the display by the television receiver, wherein the requesting is performed by a second remote control device, wherein the second remote control device includes a unique identifier in the signal sent to the television receiver when programming is selected using the second remote control device, and wherein the program control data stored in the memory further comprises programming restrictions associated with the unique identifying signal of each of the first and second remote control devices, and wherein the processor processes programming requests sent by each of the first and second remote control devices.

* * * * *